R. W. HARRADINE.
FISHING REEL.
APPLICATION FILED NOV. 17, 1920.

1,398,429.

Patented Nov. 29, 1921.
2 SHEETS—SHEET 1.

UNITED STATES PATENT OFFICE.

ROBERT WILLIAM HARRADINE, OF BONDI, NEW SOUTH WALES, AUSTRALIA.

FISHING-REEL.

1,398,429.  Specification of Letters Patent.  Patented Nov. 29, 1921.

Application filed November 17, 1920. Serial No. 424,756.

*To all whom it may concern:*

Be it known that I, ROBERT WILLIAM HARRADINE, a subject of the King of Great Britain and Ireland, and resident of "Caloola," Sir Thomas Mitchell road, Bondi, in the State of New South Wales, Commonwealth of Australia, have invented certain new and useful Improvements in Fishing-Reels, of which the following is a specification.

This invention relates to devices or appliances attachable to fishing rods and on which the line is wound, and particularly to such devices as are provided with friction brake mechanism whereby the regulatable resistance to the paying out of the line may be effected and a hooked fish played until exhausted.

My invention contemplates firstly constructional improvements in fishing reels whereby the dismantling and reassemblage of the parts is facilitated, and accessibility of the friction clutch improved, and secondly, a more specific improvement by way of an additional brake whereby regulation of resistance to the run out of the line may be easily and quickly effected without disturbing the then adjustment of the friction clutch, so that the "playing" of a fish is facilitated.

With these objects my invention consists in a fishing reel having a brake ring rotated with the winding drum by means of a ratchet wheel and pawl when the drum is rotating in a direction to pay out the line but free to remain stationary when the drum is rotated to wind up the line, and coöperating with said brake ring, a brake actuated by a lever pivoted in the cheek plate which carries the spindle on which the drum revolves.

My invention also consists in a fishing reel including a brake as before mentioned, in which the friction clutch is located entirely at the crank handle end of the drum and is therefore readily accessible.

My invention still further consists in a fishing reel constituted by a novel combination and arrangement of parts embodying the before mentioned features.

To fully describe fishing reel construction embodying my improvements I will now refer to the accompanying drawings in which:—

Figure 1:
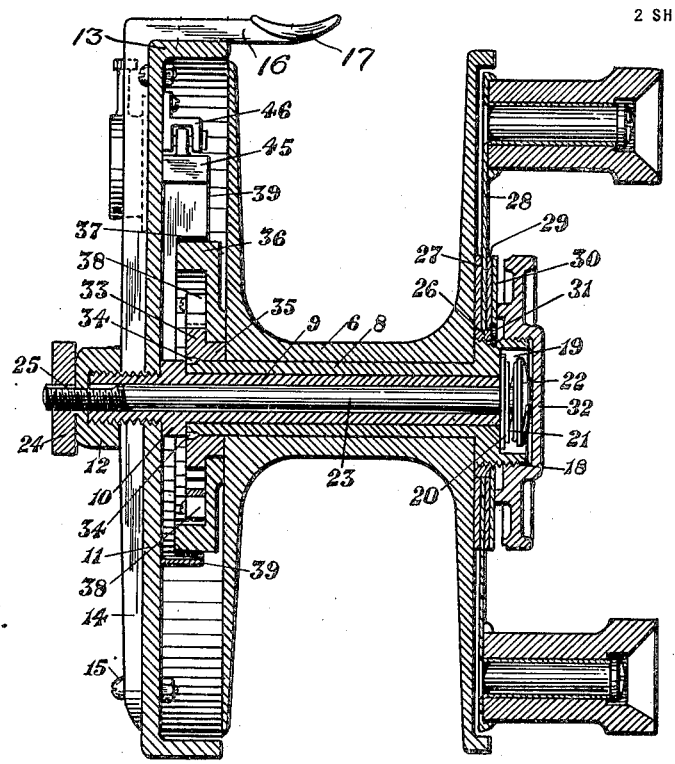
Figure 2:
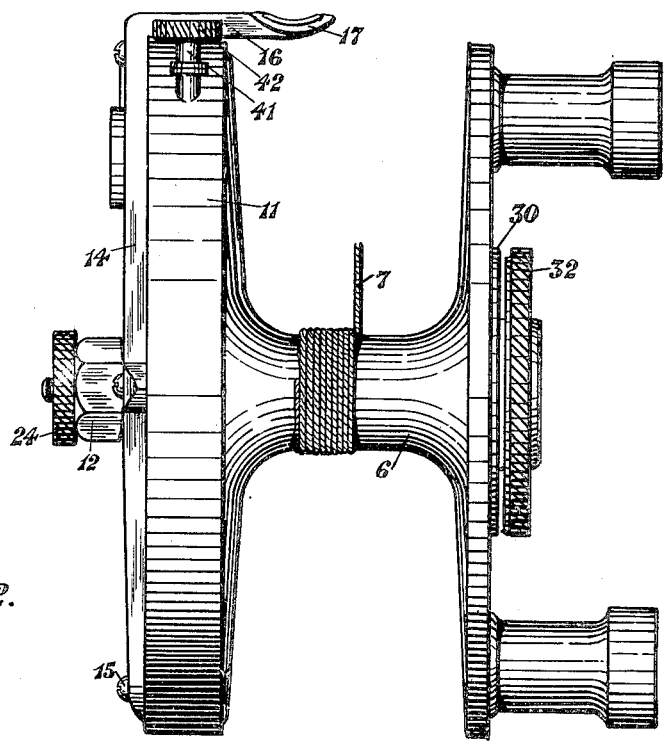
Figure 3:
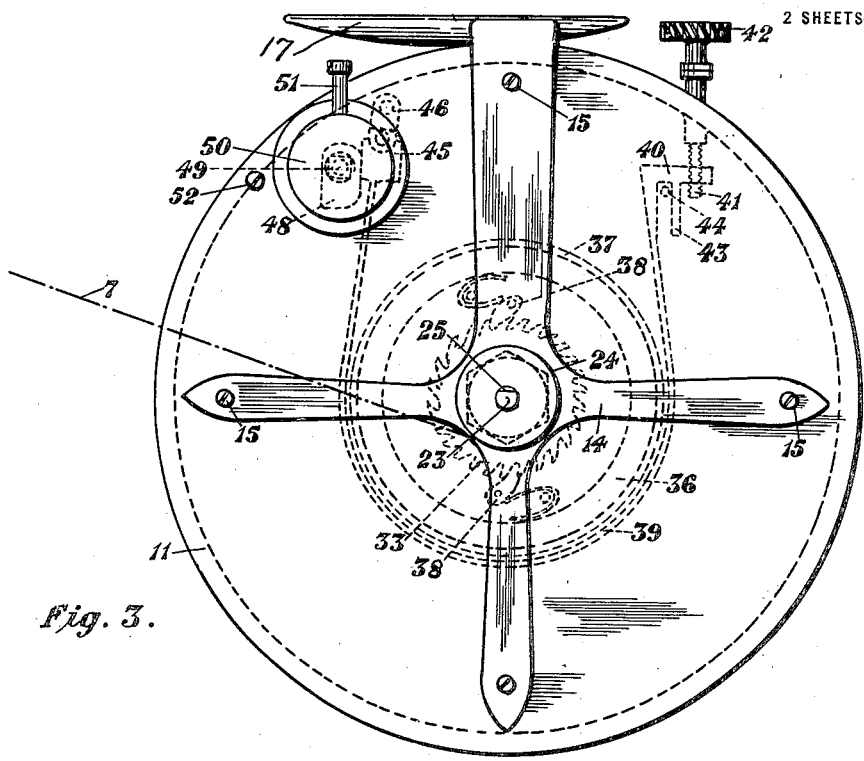

Figure 1 is a sectional elevation on a plane passing through the axis of the winding drum;

Fig. 2 a side elevation;

Fig. 3 an end elevation of the cheek plate; and.

Figure 4:
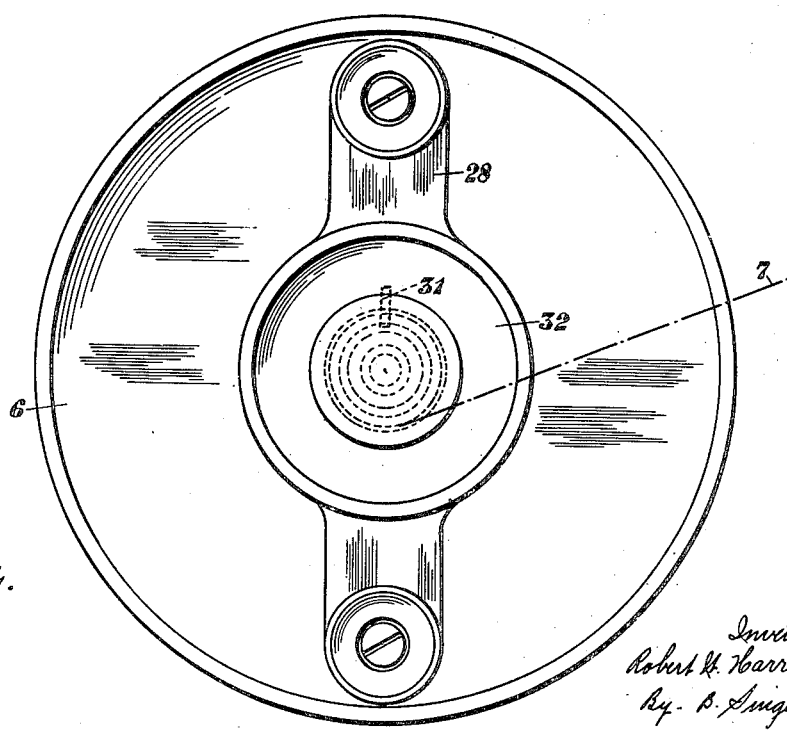

Fig. 4 an end elevation of the crank handle end of the drum.

6 is the winding drum on which the line 7 is wound as shown in Fig. 2 and in dotted lines in Figs. 3 and 4. Said drum is fitted with a bored bushing 8 rotatably mounted upon a tubular spindle 9 having a shoulder or collar 10 and screwing through the cheek plate 11, a cap nut 12 being screwed on the end of the spindle.

The cheek plate 11 which is of disk form having an annular flange 13, is affixed on a spider 14 by means of said cap nut 12 and small bolts 15—15; one leg of said spider is cranked as at 16 and is terminally formed to constitute a rod seat 17 to which a rod (not shown) is clamped by known means when the reel is in use.

At the end remote from the cheek plate the bushing 8 is enlarged, exteriorly threaded as at 18 and bored to provide a chamber 19. On the bottom of the chamber 19 bears a leather washer 20 backed by a coil spring 21 bearing under the head 22 of a bolt 23 passing axially through the tubular spindle 9 and the cap nut 12. Said bolt is terminally fitted with a milled nut 24, and to prevent the bolt turning its screwed end is slightly flattened, as shown at 25, as is also the reduced and unthreaded portion of the bore of the cap nut 12.

The bolt 23 serves to resiliently hold the bushing on the spindle 9, while the enlarged end of the bushing retains the drum 6 on the bushing.

On the thread 18 of the bushing 8 is screwed a collar 26 bearing against the end of the drum 6. On said collar 26 is first a leather washer 27, then the crank 28, then a second leather washer 29 against which bears a metal washer 30 sliding axially on the thread 18 and prevented from turning by a radial pintle 31 screwed into the bushing, the radially projecting part of said pintle engaging a radial slot in the washer 30. Terminally on the thread 18 of bushing 8 is screwed a milled nut 32 bearing against the washer 30.

By screwing up the nut 32 frictional contact is adjustably created between the crank 28 and drum 6 as may be required to wind up the line by rotating the crank, while allowing sufficient slip to permit the line to pay out in the event of a sudden jerk on the line. The checking of the line is not however conveniently effected by checking the rotation of the crank, so that I provide braking means for this purpose.

It will be noted that the bushing 8 at the end juxtaposed to the cheek plate 11, extends beyond the drum 6 and that a space exists between the cheek plate and drum.

On said extended portion of the bushing I fixedly mount a ratchet wheel 33 secured by means of small screws 34—34, said ratchet wheel having a boss 35. Freely mounted on said boss is a brake ring 36 having a leather tire 37 and carrying a pair of spring pressed pawls 38—38 to engage the teeth of the ratchet wheel. Said teeth are so set that on rotation of the drum (and ratchet wheel) in a direction to wind up the line (anticlockwise in Fig. 3) the teeth are not engaged by the pawls, but on rotation in reverse direction i. e. to pay out the line, the teeth are engaged by the pawls and the brake ring is rotated by the ratchet wheel. To check the paying out of the line, the rotation of the brake ring is retarded as may be required by the application of a brake comprising a band 39 partially embracing the brake ring and attached at one end to a head 40 which engages a tension adjusting screw 41 passing through the flange of the cheek plate and provided with a milled head 42. Said head 40 has a pendent guide 43 coöperating with a pin 44 to guide the band. The other end of the band is attached to a block 45 pivotally connected to a shackle 46 which is itself pivoted to the cheek plate 11. Located against the side of said block 45 and operating to press same laterally to tighten the band against the brake ring 36, is a cam 48 mounted on a pin 49 rotatably mounted in the cheek plate 11 and having externally thereof a head 50 from which a lever 51 radially projects. The brake is applied by deflecting the lever 51 to the left (in Fig. 3) the brake band being gradually tightened thereby on the ring 36, the tensity of the braking action gradually increasing until the lever 51 contacts with screw stop 52.

What I claim and desire to secure by Letters Patent is:

1. In a fishing reel, in combination, a cheek plate having an annular flange, a spider to which said plate is attached, a rod rest on one arm of said spider, a tubular spindle screwed into said cheek plate and spider, a cap-nut on the end of said spindle, a collar on said spindle bearing against the opposite face of said plate to said cap nut, a winding drum and a bushing therein rotating on said spindle, an extension of said bushing beyond the end of the drum toward said cheek plate, fixed on said extension a ratchet wheel having an annular boss, a brake ring rotating on said boss, said brake ring being between said ratchet wheel and drum, a spring controlled pawl on said ring engaging said ratchet wheel, a brake band about said brake ring said brake band being flexibly connected at one end to the cheek plate, a tensioning screw at the other end of said band, a cam pivoted in the cheek plate and operating to press said brake band into frictional contact with said brake ring, means for actuating said cam, an enlargement of the other end of said bushing extending beyond the end of the spindle, a bore in said enlargement, a bolt passing axially through said spindle and cap nut, a spring underlying the head of said bolt, a nut on the other end of said bolt, and a crank handle on said enlargement for rotating the drum.

2. In a fishing reel comprising in combination a cheek plate, means attached to the cheek plate for fitting the rod, a tubular spindle carried by said cheek plate, a winding drum having a bushing rotating on said spindle, an extension of said bushing beyond the drum toward the cheek plate to provide a space between said drum and cheek plate, in said space braking means to check rotation of the drum in a direction to pay out the line, means for actuating said braking means, an extension and enlargement of said bushing beyond the other end of the drum, a collar on said enlargement, a crank handle rotating and moving axially on said collar, and a bolt through said tubular spindle operating to hold the bushing thereon, friction clutch mechanism comprising a leather washer about said collar on the bushing enlargement and between the crank handle and the end of the drum, a second leather washer against the outside face of said crank handle, a metal washer bearing against said second leather washer and nonrotatable but axially movable on said enlargement, and a friction-adjusting nut screwing on said enlargement and bearing against said metal washer.

Signed at Sydney this thirteenth day of October, A. D. 1920.

ROBERT WILLIAM HARRADINE.